(12) United States Patent
Minogue et al.

(10) Patent No.: US 7,113,894 B2
(45) Date of Patent: Sep. 26, 2006

(54) SYSTEM AND METHOD FOR COORDINATED REMOTE ACTIVATION OF MULTIPLE SOFTWARE-BASED OPTIONS

(75) Inventors: Michael R. Minogue, Milwaukee, WI (US); Geoffrey S. Christanday, Milwaukee, WI (US); Esmeraldo R. V. Davantes, Pewaukee, WI (US); Winnie C. Durbin, Dousman, WI (US); Kun Zhang, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/161,089

(22) Filed: Jul. 22, 2005

(65) Prior Publication Data

US 2005/0278149 A1    Dec. 15, 2005

Related U.S. Application Data

(63) Continuation of application No. 10/605,804, filed on Oct. 28, 2003, now Pat. No. 6,990,434.

(51) Int. Cl.
*G06F 15/00* (2006.01)

(52) U.S. Cl. .................................... 702/188; 713/168
(58) Field of Classification Search ............... 326/8; 365/185.04; 702/188; 705/18; 713/152, 713/190, 191, 168
See application file for complete search history.

(56) References Cited

U.S. PATENT DOCUMENTS

| | | | |
|---|---|---|---|
| 4,888,798 A | 12/1989 | Earnest | |
| 5,014,234 A | 5/1991 | Edwards, Jr. | |
| 6,044,471 A | 3/2000 | Colvin | |
| 6,246,770 B1 * | 6/2001 | Stratton et al. | 380/281 |
| 6,272,636 B1 | 8/2001 | Neville et al. | |
| 6,301,666 B1 | 10/2001 | Rive | |
| 6,360,254 B1 | 3/2002 | Linden et al. | |
| 6,418,225 B1 * | 7/2002 | Stratton et al. | 380/281 |
| 6,569,101 B1 | 5/2003 | Quistgaard et al. | |
| 6,711,262 B1 | 3/2004 | Vatanen | |
| 6,829,704 B1 * | 12/2004 | Zhang et al. | 713/1 |
| 6,990,434 B1 * | 1/2006 | Minogue et al. | 702/188 |
| 2002/0152395 A1 | 10/2002 | Zhang et al. | |
| 2002/0152400 A1 | 10/2002 | Zhang et al. | |
| 2002/0152401 A1 | 10/2002 | Zhang et al. | |
| 2005/0090731 A1 | 4/2005 | Minogue et al. | |
| 2005/0091422 A1 | 4/2005 | Minogue et al. | |

* cited by examiner

*Primary Examiner*—Michael Nghiem
*Assistant Examiner*—Douglas N Washburn
(74) *Attorney, Agent, or Firm*—Ziolkowski Patent Solutions Group, SC; Michael A. Della Penna; Carl B. Horton

(57) ABSTRACT

A system and method are provided to remotely activate options resident on a plurality of devices within a site. The invention includes generating a number of activation keys, each of which is specific to one of a plurality of in-field devices having inactive options resident in a memory of each of the plurality of in-field devices, and sending each representative activation key and a verification script to each of the in-field devices. The invention then includes receiving a report from each of the verification scripts and evaluating each report independently, whereby if the report is satisfactory for a corresponding in-field device, the respective activation key is installed in the corresponding in-field device to activate an option and if the report is not satisfactory for a corresponding in-field device, aborting activation of the option for the corresponding in-field device.

24 Claims, 2 Drawing Sheets

SYSTEM AND METHOD FOR COORDINATED REMOTE ACTIVATION OF MULTIPLE SOFTWARE-BASED OPTIONS

CROSS-REFERENCE TO RELATED APPLICATION

The present application is a continuation and claims priority to U.S. Ser. No. 10/605,804 filed Oct. 28, 2003, now issued as U.S. Pat. No. 6,990,434.

BACKGROUND OF THE INVENTION

The present invention relates generally to a system to enable software-based options, and more particularly, to a system and method to automatically respond to a request for activation of software options resident on remote devices within a particular site. The invention includes automatically identifying the devices, verifying the status of each remote device and, if a remote device is in condition for activation, automatically activating the desired option.

Medical diagnostic devices and supporting systems, such as medical imaging systems, have become increasingly complex in recent years. Examples of such systems include magnetic resonance imaging (MRI) systems, computed tomography (CT) systems, ultrasound and x-ray systems, and positron emission tomography (PET) systems. These systems include many different software-based options, some of which are not used depending on customer needs and costs. To add to the complexity of each particular imaging system, many facilities today incorporate a variety of such devices all of which may not be configured identically. In larger facilities, the systems may be networked to permit common management and control. Further, such systems may be networked with a picture archiving and communication system (PACS) for storing digitized image data for subsequent retrieval and reconstruction. Additionally, teleradiology systems that involve transmitting digitized image data to remote locations for review and diagnosis by specialized physicians and/or radiologists may be used as well.

Because these medical diagnostic systems are used by different facilities with differing needs, not all of these systems operate identically. That is, although identical software may be installed at the factory, certain options are not desired or licensed by a customer or user, and therefore are not enabled when delivered. If a customer later wants to add these options to their devices, a license would need to be executed and service personnel with appropriate training would have to physically travel to the location where the devices are present to enable the software in order for the customer to gain access to a particular option.

Improvements in computer networks have greatly facilitated the task of offering assistance to remote facilities with medical imaging devices. In particular, rather than having to call a service center and speak with a technician or engineer, or await the arrival of a field engineer, network technologies have facilitated proactive techniques wherein the service center may contact the medical diagnostic devices directly to check the status of the remote devices.

While such advancements in the provision of remote services to medical diagnostic devices have greatly enhanced the level of service and information exchange, they have not been used to remotely identify and verify a site consisting of a plurality of networked in-field devices to thereby grant access to and permit use of software options resident on the in-field devices incorporated within a particular site.

There is a need for a system where a qualified customer can activate particular options already resident in memory of devices within the customer's system without requiring multiple levels of human interaction to ensure that enabling the particular options is possible and can be implemented on each of the desired devices. That is, a system is needed to allow the customer to activate options of multiple devices within a site without an arduous process of manually evaluating each device in the site.

It would therefore be desirable to have a system to automatically identify each device within a remote site, verify the current status of the devices and, if the current status of the device is such that activation of the particular option is appropriate, automatically activate desired options on each of the devices within the site.

SUMMARY OF THE INVENTION

The present invention is directed to a system and method to automatically respond to a request for activation of software options resident on remote devices within a particular site that overcomes the aforementioned drawbacks. The invention includes automatically identifying the devices, verifying the status of each remote device and, if a remote device is in condition for activation, automatically activating the desired option.

In accordance with one aspect of the invention, an automated method of remotely activating options resident on a plurality of devices is disclosed. The method includes generating a number of activation keys, each of which is specific to one of a plurality of in-field devices having inactive options resident in a memory of each of the plurality of in-field devices, and sending each representative activation key and a verification script to each of the in-field devices. The method then includes receiving a report from each of the verification scripts and evaluating each report independently, whereby if the report is satisfactory for a corresponding in-field device, the respective activation key is installed in the corresponding in-field device to activate an option and, if the report is not satisfactory, for a corresponding in-field device, aborting activation of the option for the corresponding in-field device.

In accordance with another aspect of the invention, a system to respond to a request to remotely enable options resident in the memory of a plurality of in-field devices is disclosed. The system includes a centralized facility located remotely from a plurality of in-field devices having inactive options. The centralized facility has at least one computer programmed to select verification scripts to check that each of the plurality of in-field devices is in condition to activate an inactive option and select activation keys unique to each of the plurality of in-field devices. The at least one computer is also programmed to send at least one verification script and at least one activation key to each of the plurality of in-field devices wherein each of the in-field devices is capable of executing the verification script and independently aborting activation of inactive option if a report indicates that one of the plurality of in-field devices is not in a condition to activate the inactive option.

In accordance with yet another aspect of the invention, a system to remotely enable options through a network of in-field devices is disclosed that includes a network of in-field devices located remotely from a centralized facility. The network of in-field devices is programmed to send a single access request to the centralized facility to request activation of options of the in-field devices, receive activation keys uniquely configured to activate the options of the in-field devices and verification scripts to authenticate a current status each of the in-field devices, and send a report generated by the verification scripts to the centralized facility indicating the current status of the in-field devices. The network of in-field devices is further programmed to install one activation key in one of the in-field devices to activate the options in the one in-field device if the current status of the one in-field device is determined to be satisfactory by the centralized facility, and continue to send a report generated by the verification scripts and install one activation key for each of the in-field devices of the network.

Various other features, objects and advantages of the present invention will be made apparent from the following detailed description and the drawings.

BRIEF DESCRIPTION OF THE DRAWINGS

The drawings illustrate a preferred embodiment as presently contemplated for carrying out the invention.

In the drawings.

DETAILED DESCRIPTION OF THE PREFERRED EMBODIMENT

The present invention is directed to a technique to automatically identify multiple devices within a site, verify the settings of each device, and, if in proper condition, enable an inactive software option resident in each device.

Figure 1:
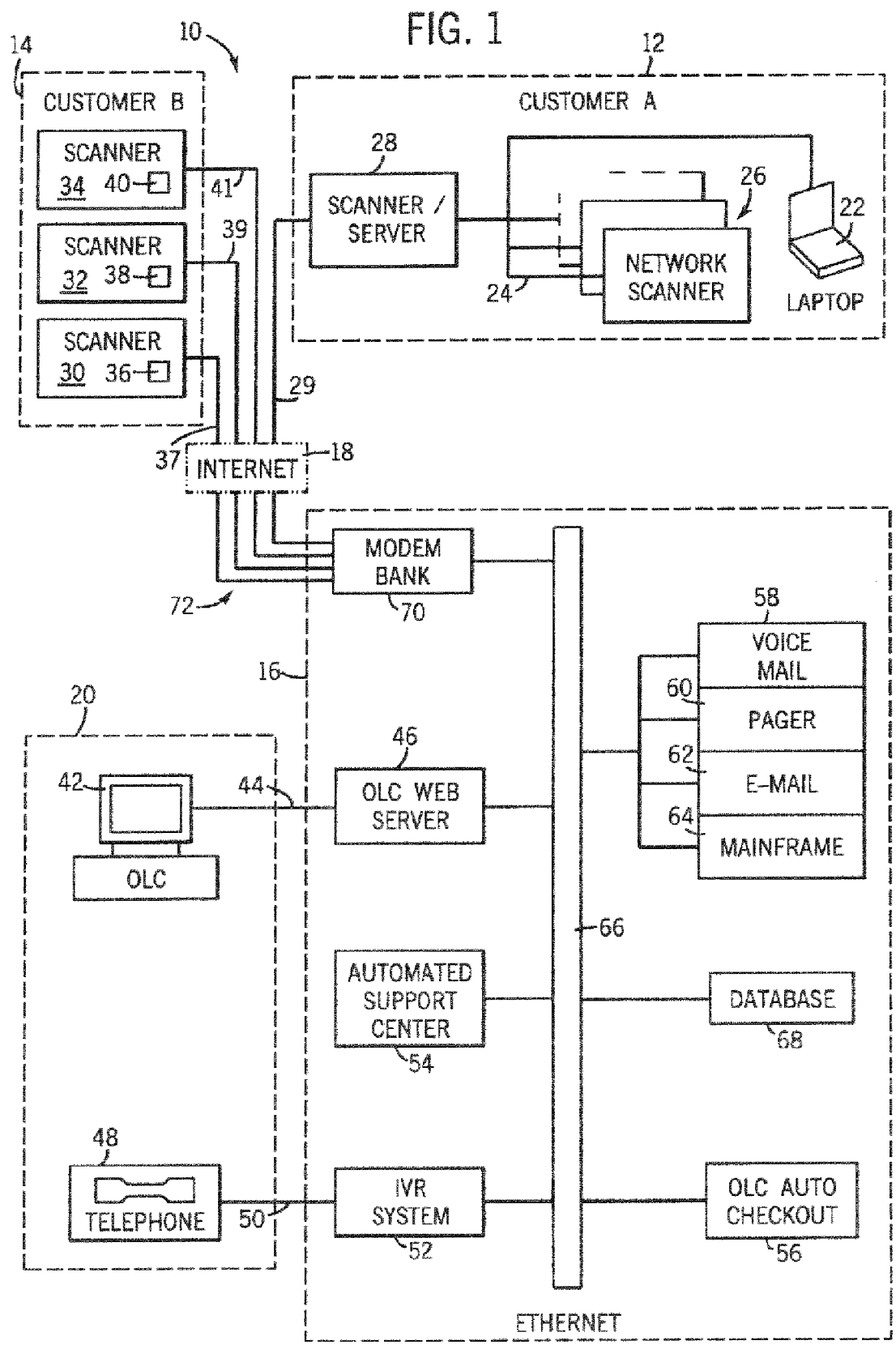
FIG. 1 is a block diagram of a system for which the present invention is implemented therein.

Referring to FIG. 1, an overview block diagram of a medical diagnostic and service networked system 10 is shown which includes a plurality of remote customer stations, such as Customer A in a customer station 12 and Customer B in another customer station 14. It is understood that the number of customer stations can be limitless, but two specific embodiments are shown with Customer A and Customer B, which will be further explained hereinafter. The customer stations 12, 14 are connected to a centralized facility 16 through a communications link, such as a network of interconnected server nodes/Internet 18 or a remote link 20. Although a single centralized facility 16 is shown and described, it is understood that the present invention contemplates the use of multiple centralized facilities, each capable of communication with each customer station. Each customer station has operational software associated therewith which can be configured, serviced, maintained, upgraded, monitored, enabled or disabled by the centralized facility 16.

The various systems disclosed are configured to be selectively linked to the centralized facility 16 by either the remote link 20, or in the example of customer station 12, a laptop computer 22 connected to an internal network 24 of Customer A. Such selective linking is desirable to provide upgrades, maintenance, service, and general monitoring of the various systems and equipment at a customer site, which includes accessing data from the systems and transmitting data to the systems, for example.

In general, a customer site may have a number of devices such as a variety of medical diagnostic systems of various modalities. As another example, in the present embodiment, the devices may include a number of networked medical image scanners 26 connected to an internal network 24 served by a single scanner 28 having a workstation configured to also act as a server, or configured as a stand-alone server without a medical image scanner associated therewith. Alternately, a customer station, or customer site 14 can include a number of non-networked medical image scanners 30, 32, and 34 each having a computer or work station associated therewith and having an internal modem 36, 38, and 40 to connect the remote customer station to a communications link, such as the Internet 18 through links 37, 39, and 41, respectively, to communicate with the centralized facility 16. Internet 18 is shown in phantom to indicate that an external communications network can include Internet 18, together with communication links 29, 37, 39, and 41, or alternatively, can include direct dial-up links through dedicated lines, an intranet, or public communications systems.

It is understood that each of the network scanners 26 has its own workstation for individual operation and are linked together by the internal network 24 so that the customer can have a centralized management system for each of the scanners. Further, such a system is provided with communications components allowing it to send and receive data over a communications link 29. Similarly, for the non-networked medical image scanners at remote customer station 14, each of the scanners 30, 32, and 34 have individual communications links 37, 39, and 41. Although FIG. 1 shows each of these links connected through an open network 18, these links can permit data to be transferred to and from the systems over a dedicated network as well.

The embodiment shown in FIG. 1 contemplates a medical facility having such systems as magnetic resonance imaging (MRI) systems, ultrasound systems, x-ray systems, computed tomography (CT) systems, as well as positron emission tomography (PET) systems, or any other type of medical imaging system, however, the present invention is not so limited. Such facilities may also provide services to centralized medical diagnostic management systems, picture archiving and communications systems (PACS), teleradiology systems, etc. Such systems can be either stationary and located in a fixed place and available by a known network address, or be mobile, having various network addresses. In the embodiment shown in FIG. 1, each customer station 12, 14 can include any combination of the aforementioned systems, or a customer station may have all of a single type of system. A customer station can also include a single medical image scanner. Mobile diagnostic systems can be configured similarly to that of customer station 12 or customer station 14. Such mobile diagnostic systems can include equipment of various modalities, such as MRI, CT, ultrasound, or x-ray systems and are mobilized in order to service patients at various medical facilities.

A request for access and enablement of software-based options of the present invention can be initiated by authorized personnel, such as an on-line engineer or technician, or customer administrative personnel from a computer or workstation 42 in the remote link 20, which can be a part of the centralized facility 16, or be separately connected to the centralized facility 16 by a dialup link 44 to a web server 46 in the centralized facility 16. Alternatively, it is contemplated that the system could be initialized by a laptop computer 22 connected to a customer internal network 24, or individually connected to each of the scanners 30, 32, or 34. The remote link 20 can also serve to connect the centralized facility 16 to a customer station by a telephone and telephone connection 48 through a conventional telephone network 50 and to an interactive voice recognition system (IVR) 52 in the centralized facility 16. The centralized facility 16 includes a number of processing systems including computers for the IVR system 52, an automated support center 54, the web server 46, and an auto checkout server 56, for processing customer and product data and creating an appropriate configuration file. Other processor systems include computers to maintain a voicemail system 58, a pager system 60, an email system 62, and a main frame 64, and more generally, an output report generator and notifier. Each is connectable and can transmit data through a network, such as an Ethernet 66, with one another and/or with at least one database 68. However, it is understood that the single representation of a database in FIG. 1 is for demonstrative purposes only, and it is assumed that there is a need for multiple databases in such a system. It is also understood that the IVR system is not only a voice recognition system, but can also process interactive keypad entry from a touch-tone telephone 48. A bank of modems 70 is connected to the Ethernet 66 to relay data from the centralized facility 16 to the remote customer stations 12, 14 through a plurality of modem links 72. Hence, a system to allow automatic remote transfer of data and communications between the centralized facility 16 and a customer site 12, 14 is achieved.

As previously discussed, each of the systems and substations described herein and referenced in FIG. 1 may be linked selectively to the centralized facility 16 via a network 18. According to the present invention, any acceptable network may be employed whether public, open, dedicated, private, or so forth. The communications links to the network may be of any acceptable type, including conventional telephone lines, fiber optics, cable modem links, digital subscriber lines, wireless data transfer systems, or the like. Each of the systems is provided with communications interface hardware and software of generally known design, permitting them to establish network links and exchange data with the centralized facility 16. The systems are provided with interactive software so as to configure the systems and exchange data between the customer stations and the centralized facility 16. In some cases, during periods when no data is exchanged between the customer stations and the centralized facility, the network connection can be terminated. In other cases, the network connection is maintained continuously.

The present invention includes a technique for reviewing a remote device for a current status, and if approved for activation, granting access to and remotely permitting use of resident software options in the remote device. As previously indicated, the device, including medical imaging equipment, includes installed software that controls options that are can be enabled or disabled automatically. The present invention is directed toward an expeditious method and system to automatically and remotely access in-field devices within a common site, verify the current status of each in-field device, and enable options resident on each in-field device.

From a centralized facility, and after appropriate authentication of the user and validation of the system identification and customer's status, an electronic enabler is generated in the centralized facility 16 and electronically transmitted to a device via the communication links 29, 37, 39, 41, and/or 72, preferably over a private communication link, but other public communications systems can work equally well, such as direct dial-up internet or wireless communications. As previously set forth, it is understood that the external communications links include a closed intranet system, an open public communications system, or a combination thereof.

Figure 2:
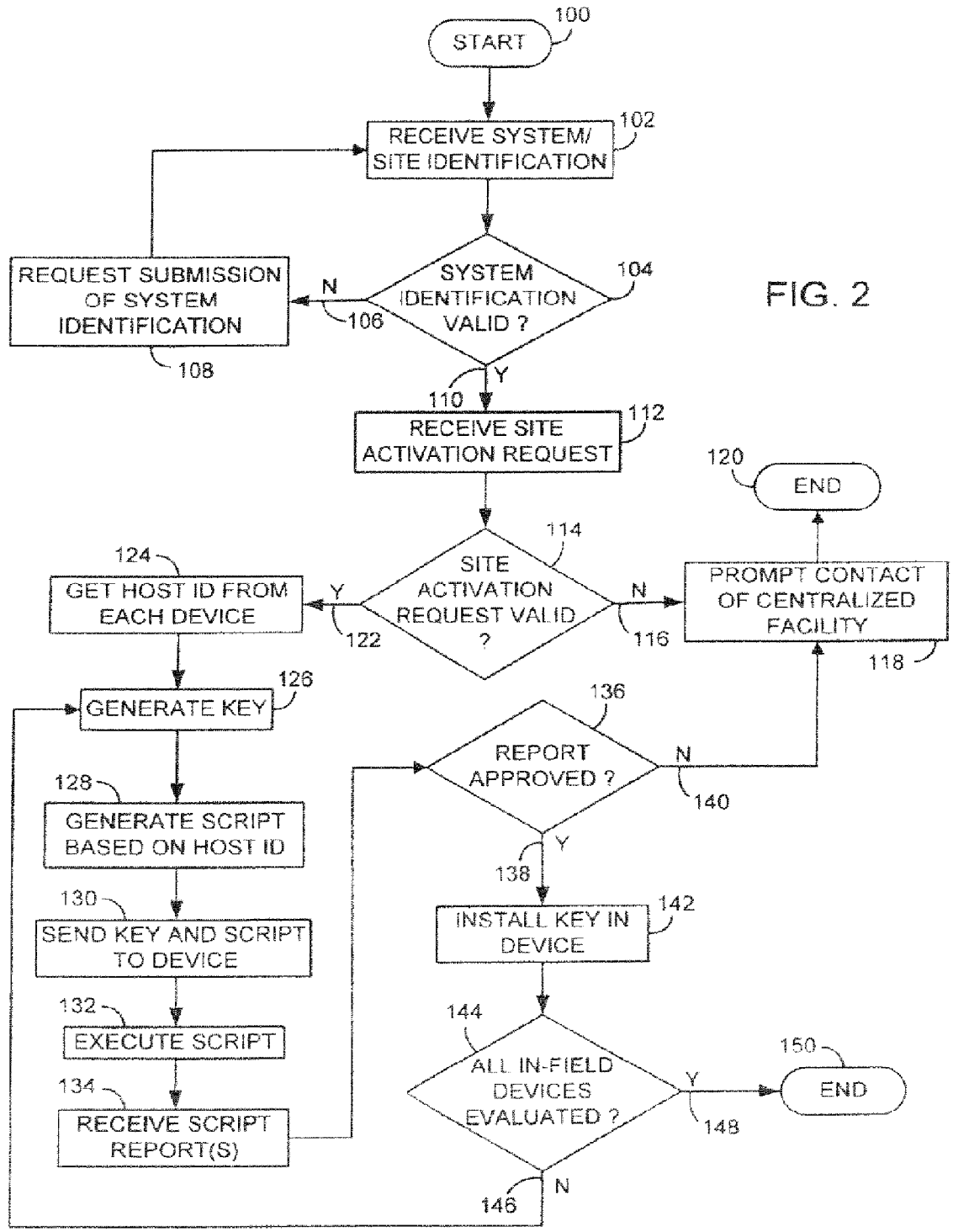
FIG. 2 is a flow chart showing a process of the present invention and implemented in the system of FIG. 1.

Referring to FIG. 2, the technique is initiated 100 when a system identification including a customer identification is sent from a remote customer station or a remote link and received at the centralized facility 102. It is contemplated that the system identification may include or reference billing account information and a unique site identification. As such, it is possible to identify both the customer and the customer's site from the system identification. It is contemplated that the system identification constitutes the initiation of an enablement request. That is, the requesting device may have been originally purchased having a plurality of options and, due to pricing considerations, the device was purchased with some of the options initially disabled. Therefore, the initial purchase of the hardware of the device included a wide variety of options and the customer may have chosen that specific options be disabled to reduce the overall purchase price of the device. Accordingly, after purchase, the customer may make an enablement or activation request to enable any of the options resident on the device at the time of purchase but disabled due to pricing choices. It is further contemplated that the activation request may be to enable options added after the initial purchase as part of an update or upgrade but disabled to reduce the price of the upgrade or update.

After receiving the system identification, the centralized facility then validates the system identification at 104. Validation is determined according to the customer identification and/or a passphrase from the system identification. The centralized facility identifies the customer making the request and the customer's in-field devices. If the customer identification is not valid 106, a prompt for entry of a valid customer identification is made 108.

After the system identification is validated 104, 110, a site activation request is sent from the remote customer site and received by the centralized facility 112. The centralized facility then validates the activation request at 114. Specifically, the centralized facility makes an initial review of the activation request by comparing the system identification to the activation request. The centralized facility determines whether the in-field devices within the site are capable of the activation requested. For example, the centralized facility determines whether the in-field devices are of a modality that are operable with the requested option or whether the requested activation has previously been made and fulfilled, and therefore, the options are already enabled in the in-field devices of the customer's site.

If the activation request 112 is determined to be invalid 116, e.g., does not register the requesting site to include in-field devices supporting the software-based options requested or the requested options are already active within the particular in-field devices, a message is returned to the in-field device to prompt manual contact with the centralized facility 118 and the activation is aborted 120.

However, if the activation request is determined to be valid 122, the centralized facility requests a host identification from each of the in-field devices within the site 124. These unique host identifications indicate the specifics of the particular in-field device to the centralized facility. Based on the each host identification, the centralized facility generates an activation key specifically configured for a particular in-field device to activate the desired options upon installation in the particular in-field device 126. Furthermore, the centralized facility selects a verification script appropriate to determine a current status of the particular in-field device 128. Once the activation key has been generated 126 and the verification script selected 128, the centralized facility sends the key and script to the in-field device 130. It is contemplated that script and key may be sent to each in-field device in a single transmission or through multiple transmissions.

Furthermore, it is contemplated that each key and script may be bundled together to create a single package that is sent to each in-field device. It is further considered that the single package may be compressed and/or encrypted to expedite and secure transmission.

When a particular in-field device receives the key and script, the device unbundles the package, if necessary, and executes the verification script 132. The verification script is configured to automatically determine a current status of the particular in-field device for which it was generated in order to compile information about the current status of the particular in-field device that is relevant to activation of the requested option. Specifically, the verification script gathers a plurality of current settings of the in-field device and generates a report. For example, the verification script may determine any options currently active on the particular in-field device, options supported by the particular in-field device, any dependencies of options supported by the particular in-field device, as well as other similar settings. As such, the report contains information regarding the enableability of the in-field device with respect to the requested option. That is, the information included in the report pertains to the current setting of the in-field device and whether under those settings the in-field device is able to have the requested option enabled, i.e. the enableability of the in-field device. The information is then used by the verification script to generate a report that is sent by the in-field device and received by the centralized facility 134.

It is contemplated that the reports from each particular in-field device of the site may be sent individually to the centralized facility. As such, the centralized facility receives each report individually and evaluates each report as received individually 136. Therefore, if a particular report from an individual in-field device is deemed unapproved, a message to prompt contact of the centralized facility is sent pertaining to the individual in-field device. Accordingly, the reports pertaining to the in-field devices are received and evaluated independently.

Alternatively, it is contemplated that the reports from the in-field devices may be bundled and sent in a single transmission to the centralized facility once all the reports are generated. The transmission is sent as a compact file that is received at the centralized facility. As such, the centralized facility waits for the single transmission rather than each individual report and then unbundles the reports. However, while the receipt of the bundle includes the reports from each in-field device, the reports are independently evaluated 136. As such, if a report pertaining to an individual in-field device is deemed approved 138 or unapproved 140, the approval 138 or disapproval 140 of the remaining in-field devices is uninfluenced.

Furthermore, it is contemplated that a single report incorporating all of the reports from each of the particular in-field devices may be compiled and sent to the centralized facility. Specifically, should the site include a server configured to coordinate communication between the site and the centralized facility, the reports from the in-field devices are received by the server and then used to generate a single, master report that includes the information from the reports from each particular in-field device. The server then sends the single report to the centralized facility. Again, however, when evaluating the single report 136, the centralized facility reviews each portion of the single report that pertains to a particular in-field device independently. Therefore, whether a particular in-field device is approved 138 or disapproved 140 does not influence the approval or disapproval of the other in-field devices.

However, it is also contemplated that the report may be evaluated as a whole. Accordingly, when the single, master report is received, the report is evaluated and all devices within the site are either approved 138 or disapproved 140 together. As such, whether a particular in-field device is approved 138 or disapproved 140 does influence the approval or disapproval of the other in-field devices. Accordingly, the entire site is effectively approved or disapproved.

To determine whether to approve 138 or disapprove 140 activation of an option resident on a particular in-field device, the centralized facility evaluates the report 136 to determine the enableability of the particular in-field device with respect to the requested option. If the report indicates the device is enableable, the report is approved 138 and the centralized facility permits installation of the activation key in the in-field device 138. Specifically, the centralized facility sends an approval to the particular in-field device whereby the particular in-field device installs the activation key enabling the option 142. Following installation, the centralized facility may monitor the use of the option. As such, the activation key may contain a present expiration time, whereby the centralized facility may warn the customer of an impending expiration. Should the customer elect to reactivate the option, the steps described above are repeated and the option is reactivated.

Following approval of a particular in-field device, the centralized facility checks to determine whether all in-field devices of the site have been evaluated 144. It is contemplated that this review of the site may be accomplished through a number of procedures. For example, should the centralized facility serially evaluate each in-field device of the site, the centralized facility reviews the host identifications received from each device 124, and if a key has not been generated for a particular host identification 146, then the centralized facility repeats the above described process beginning with the generation of a activation key that is specific to the particular host identification 126.

It is also contemplated that the centralized facility may service each in-field device in parallel. In this case, to determine whether all in-field devices have been evaluated 146, the centralized facility checks that a report has been received from each of the in-field devices. If a report corresponding to each of the scripts that were sent 130 has not been received, the centralized facility waits until such report is received 134 and continues by evaluating the report. In any case, once the centralized facility determines that all in-field devices have been evaluated 148, the site activation is complete and the process ends.

However, if a report indicates that the desired option cannot readily be activated, the centralized facility does not approve the report 140. Accordingly, a message is returned to the in-field device to prompt manual contact with the centralized facility 118 and the activation is aborted 120. Specifically, the particular in-field device from which the report was generated is identified in the message and the activation process for the particular in-field devices is complete 120. However, it is contemplated that disapproval of the report pertaining to a particular in-field device 140 does not affect the enableability of other in-field devices within the site. Therefore, while the activation process pertaining to a particular in-field device may be completed without effectuating activation of the desired option, the desired option may be enabled in other in-field devices of the site and the activation for the remaining in-field devices is continued.

Accordingly, the present invention includes a method to simultaneously and remotely activate options resident in the memory of a plurality of in-field devices within a site without compromising the functionality of the in-field devices within the site.

It is contemplated that the above-described technique may be embodied as an automated method of remotely activating options resident on a plurality of devices. The method includes generating a number of activation keys, each of which is specific to one of a plurality of in-field devices having inactive options resident in a memory of each of the plurality of in-field devices, and sending each representative activation key and a verification script to each of the in-field devices. The method then includes receiving a report from each of the verification scripts and evaluating each report independently, whereby if the report is satisfactory for a corresponding in-field device, the respective activation key is installed in the corresponding in-field device to activate an option and if the report is not satisfactory for a corresponding in-field device, aborting activation of the option for the corresponding in-field device.

It is further contemplated that the above-described technique may be embodied as a system to respond to a request to remotely enable options resident in the memory of a plurality of in-field devices. The system includes a centralized facility located remotely from a plurality of in-field devices having inactive options. The centralized facility has at least one computer programmed to select verification scripts to check that each of the plurality of in-field devices is in condition to activate an inactive option and select activation keys unique to each of the plurality of in-field devices. The at least one computer is also programmed to send at least one verification script and at least one activation key to each of the plurality of in-field devices wherein each of the in-field devices is capable of executing the verification script and independently aborting activation of inactive option if a report indicates that one of the plurality of in-field devices is not in a condition to activate the inactive option.

It is also contemplated that the above-described technique may be embodied as a system to remotely enable options through a network of in-field devices that includes a network of in-field devices located remotely from a centralized facility. The network of in-field devices is programmed to send a single access request to the centralized facility to request activation of options of the in-field devices, receive activation keys uniquely configured to activate the options of the in-field devices and verification scripts to authenticate a current status each of the in-field devices, and send a report generated by the verification scripts to the centralized facility indicating the current status of the in-field devices. The network of in-field devices is further programmed to install one activation key in one of the in-field devices to activate the options in the one in-field device if the current status of the one in-field device is determined to be satisfactory by the centralized facility, and continue to send a report generated by the verification scripts and install one activation key for each of the in-field devices of the network.

The present invention has been described in terms of the preferred embodiment, and it is recognized that equivalents, alternatives, and modifications, aside from those expressly stated, are possible and within the scope of the appending claims.

What is claimed is:

1. An automated method of remotely activating options resident on a device comprising the steps of:
   generating an activation key in a centralized facility which is specific to an in-field device having inactive options resident in the in-field device;
   electronically sending the activation key and a verification script from the centralized facility, directly into the in-field device; and
   receiving, at the centralized facility, an acknowledgement responsive to the verification script such that if the acknowledgement is satisfactory for the in-field device, the activation key is installed and enables utilization of an inactive option of the in-field device.

2. The automated method of claim 1 wherein if the acknowledgement is unsatisfactory, the activation key is discarded and the inactive option is maintained as inactive.

3. The automated method of claim 2 further comprising the step of communicating a discard of the activation key to the in-field device.

4. The automated method of claim 1 further comprising the step of receiving a device identifier from the in-field device.

5. The automated method of claim 4 further comprising the step of associating a plurality of inactive options with the device identifier.

6. The automated method of claim 1 further comprising the step of bundling the activation key and the verification script prior to sending the activation key and the verification script to the in-field device.

7. The automated method of claim 1 wherein the in-field device is further defined as a medical imaging device.

8. The automated method of claim 1 further comprising generating another activation key which is specific to another in-field device having inactive options resident in the another in-field device, the in-field device and the another in-field device being located in one of a common facility and different facilities.

9. A system to respond to a request to remotely enable options resident at a plurality of in-field devices, the system comprising:
   a centralized facility located remotely from a plurality of in-field devices having inactive options and capable of executing a script to enable a selected inactive option, and the centralized facility having at least one computer programmed to:
   send a selected verification script and a selected activation key to at least one of the plurality of in-field devices responsive to a request to activate the selected inactive option; and
   abort activation of the selected inactive option if the at least one of the plurality of in-field devices is not in a condition to activate the inactive option.

10. The system of claim 9 wherein the computer is further programmed to independently determine if any of the plurality of in-field devices is in condition to activate the inactive options and install the activation key independently in each of the in-field devices.

11. The system of claim 9 wherein the computer is further programmed to generate the selected activation key upon receipt of the request and the activation key is operable with the at least one of the plurality of in-field devices.

12. The system of claim 11 wherein the activation key is operable with a group of in-field devices wherein the at least one in-field device is included in the group of in-field devices.

13. The system of claim 9 wherein the selected verification script and the selected activation key are specific to at least one of a selected inactive option and a group of a plurality of inactive options.

14. The system of claim 9 wherein the computer is further configured to request communication with the centralized facility if the selected inactive option remains inoperable after receipt of the selected verification script and the selected activation key.

15. The system of claim 9 wherein at least one of the plurality of in-field devices is further defined as an MRI device, a CT device, an X-ray device, or a PET device.

16. A system to remotely enable options through a network of in-field devices, the system comprising:
a network of in-field devices located remotely from a centralized facility, at least one of the in-field devices programmed to:
   (A) request centralized facility activation of an inactive option;
   (B) receive an activation key and a verification script from the centralized facility configured to activate the requested option; and
   (C) install one activation key in one of the in-field devices to activate the option in the one in-field device responsive to a satisfactory authorization confirmation generated by the verification script.

17. The system of claim 16 further comprising repeating step (C) for each in-field device in the network.

18. The system of claim 16 wherein the authorization confirmation is determined to be satisfactory if at least one of the one in-field device has at least not previously activated the inactive option and the in-field device is configured to support the option.

19. The system of claim 16 wherein the activation key and the verification script are bundled and sent to the at least one in-field device in a single transmission.

20. The system of claim 16 wherein each in-field device in the network of in-field devices at least one of shares a facility and are located in different facilities.

21. comprising the steps of:
An automated method of remotely activating options resident on a device generating an activation key which is specific to an in-field device having inactive options resident in the in-field device;
sending the activation key and a verification script to the in-field device;
receiving an acknowledgement responsive to the verification script such that if the acknowledgement is satisfactory for the in-field device, the activation key is installed and enables utilization of an inactive option of the in-field device;
receiving a device identifier from the in-field device;
and associating a plurality of inactive options with the device identifier.

22. An automated method of remotely activating options resident on a device comprising the steps of:
generating an activation key which is specific to inactive options resident in the in-field device;
an in-field device having sending the activation key and a verification script to the in-field device;
receiving an acknowledgement responsive to the verification script such that if the acknowledgement is satisfactory for the in-field device, the activation key is installed and enables utilization of an inactive option of the in-field device;
and bundling the activation key and the verification script prior to sending the activation key and the verification script to the in-field device.

23. An automated method of remotely activating options resident on a device comprising the steps of:
generating an activation key which is specific to an in-field device having inactive options resident in the in-field device;
sending the activation key and a verification script to the in-field device;
and receiving an acknowledgement responsive to the verification script such that if the acknowledgement is satisfactory for the in-field device, the activation key is installed and enables utilization of an inactive option of the in-field device, wherein the in-field device is further defined as a medical imaging device.

24. An automated method of remotely activating options resident on a device comprising the steps of:
generating an activation key which is specific to an in-field device having inactive options resident in the in-field device;
sending the activation key and a verification script to the in-field device;
receiving an acknowledgement responsive to the verification script such that if the acknowledgement is satisfactory for the in-field device, the activation key is installed and enables utilization of an inactive option of the in-field device;
and generating another activation key which is specific to another in-field device having inactive options resident in the another in-field device and the another in-field device being located in one of a common facility and different facilities.

* * * * *